Jan. 11, 1955
W. W. ROGERS
2,699,146
FEED DISPENSER
Filed June 2, 1953
2 Sheets-Sheet 1
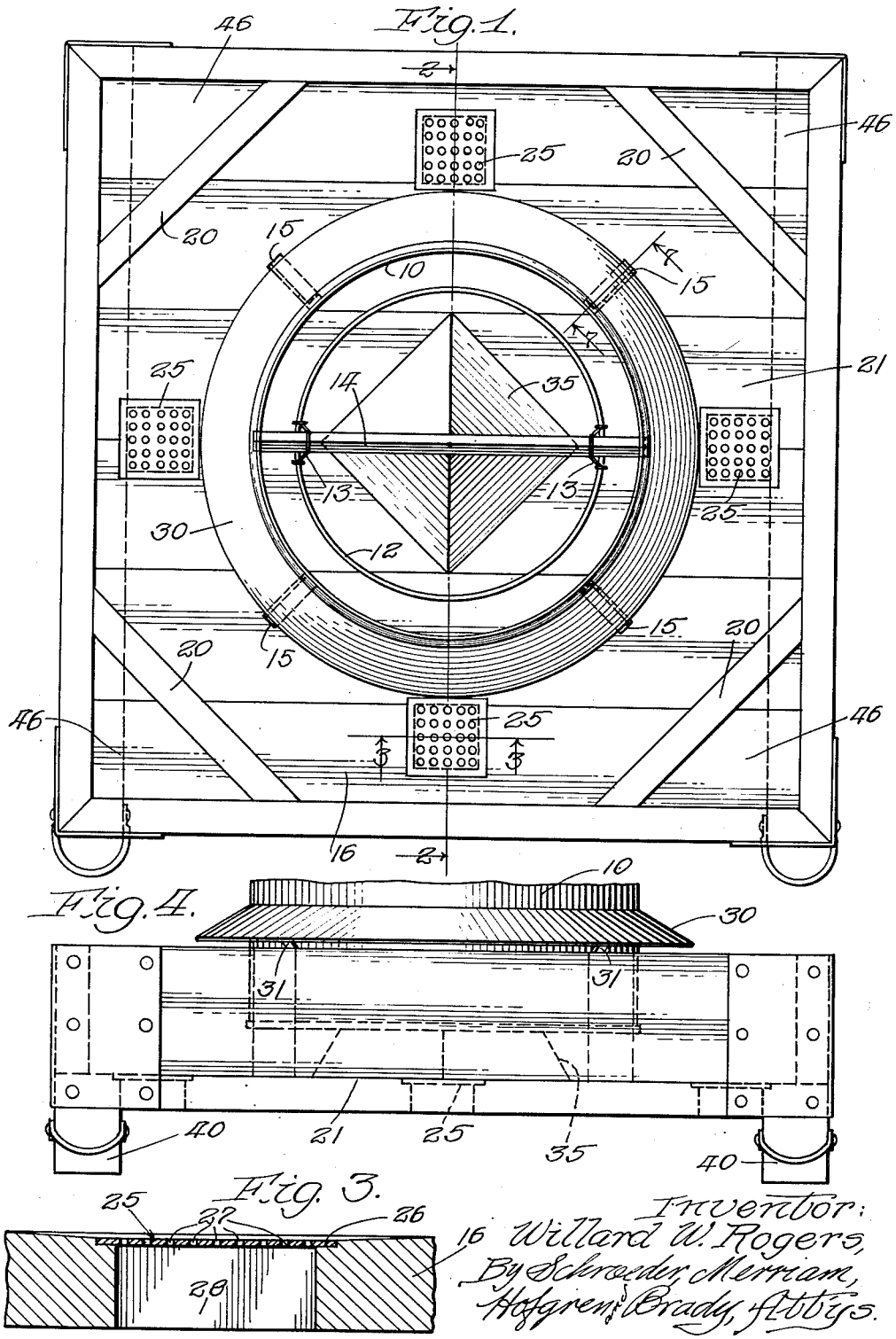

Jan. 11, 1955 W. W. ROGERS 2,699,146
FEED DISPENSER
Filed June 2, 1953 2 Sheets-Sheet 2
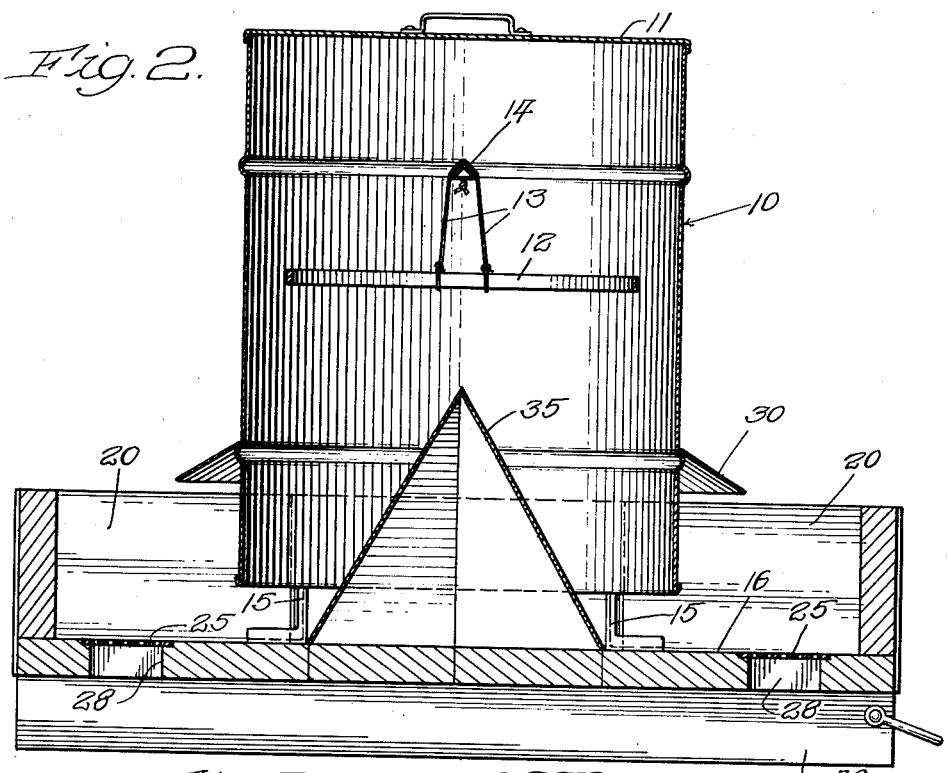
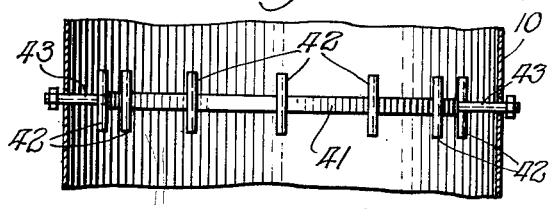
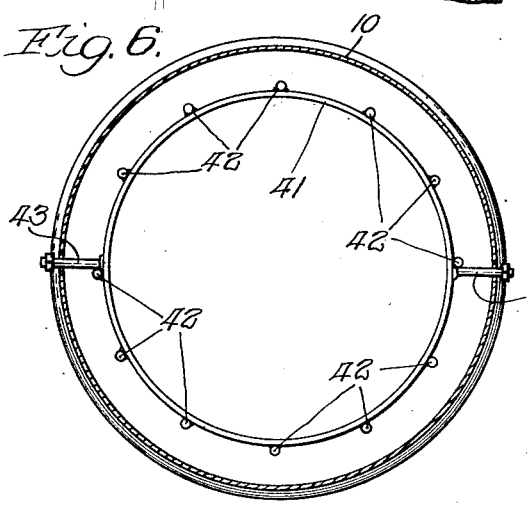
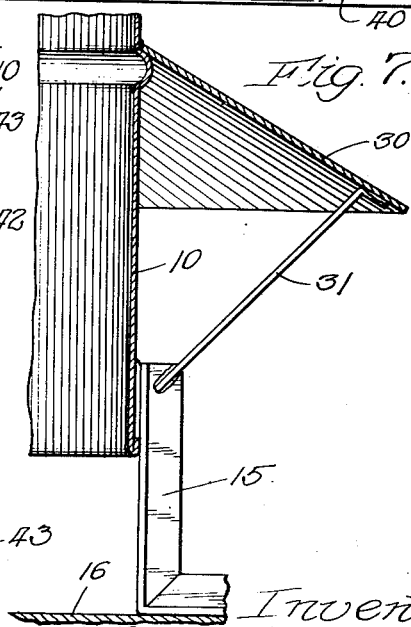
Inventor:
Willard W. Rogers,
By Schroeder, Merriam,
Holgren & Brady, Attys.

United States Patent Office 2,699,146
Patented Jan. 11, 1955

2,699,146

FEED DISPENSER

Willard W. Rogers, Ainsworth, Nebr., assignor to Rogers Grain & Feed Co., a corporation of Nebraska Application June 2, 1953, Serial No. 359,173

1 Claim. (Cl. 119—54)

This invention relates to a feed dispenser and more particularly to a dispenser for granular mineral feed supplements designed for use in the open.

It is important that this type of pellet have some protection from the weather. It is also desirable that the dispenser have means for preventing arching or compacting of the pellets within the container so that they will not feed properly.

The invention is illustrated in the drawings in which:

Figure 1 is a plan view of the preferred form of dispenser;

Figure 2 is a sectional view on line 2—2 of Figure 1;

Figure 3 is an enlarged detailed view in sectional elevation of a preferred form of drain;

Figure 4 is a front elevation of the skid location in detail;

Figure 5 is a side elevation of a modified form of slip ring;

Figure 6 is a plan view of this modified form; and

Figure 7 is an enlarged sectional view on line 7—7 of Figure 1 showing the attachment of the rain shield.

The dispenser comprises a drum 10 open at its bottom and having a removable top 11 of any desired form. Within the device is mounted a slip ring 12 which in the first embodiment is shown as suspended by wires 13 from a cross bar 14 mounted in the drum. In feeding, cattle will frequently bump the drum with their heads and the vibration thus set up agitates the slip ring sufficiently to avoid compacting or arching.

The drum is suspended by any suitable means such as the brackets 15 above a suitable platform base 16. The brackets are small and do not substantially interfere with the feeding of the pellets.

A plurality of baffles 20 are provided in the corners of the platform so as to provide, in combination with the edges of the platform, an annular area 21 roughly averaging six inches across within which the pellets are confined. This enables the livestock to consume pellets that come down freshly from the feeder without having them spread out too far over the box. The cattle prefer freshly distributed pellets and will ignore those that have stood in the bottom too long, particularly if other cattle have nuzzled the pellets and then discarded them.

A series of drains 25 are provided in the platform. These may consist of a steel plate 26 having small openings 27 drilled in it and communicating with a larger opening 28 leading to the ground.

An annular rain shield 30 may be attached to the drum as indicated in Figure 7 and supported by rods 31. Obviously, the rain shield should be high enough above the bottom of the platform so that cattle may have access to the pellets.

A spreader cone 35 is mounted centrally beneath the drum in order to facilitate spreading of the pellets.

The entire platform may be mounted on skids 40 illustrated in Figure 4. The alternate slip ring shown in Figure 5 comprises a metal ring 41 having small rods 42 welded to it and at right angles thereto. This ring is loosely mounted on rods 43 extending through the wall of the barrel and themselves loosely mounted in that wall so that the entire ring assembly will vibrate readily when the drum is bumped.

In operation, the drum is filled by removing the lid and the pellets are distributed from the bottom, being directed by the hopper and confined by the baffles. As pellets are used up by the animals, the new pellets feed continuously.

The portions 46 between the baffles 20 and the edges of the device may be employed for other feed supplements such as block salt if desired.

For the ordinary 50 gallon drum, a cone having a fourteen inch height and about a twelve inch width has been found suitable for ordinary distribution purposes.

The foregoing detailed description has been given for clearness of understanding only and no unnecessary limitations should be understood therefrom as modifications will be obvious to those skilled in the art.

I claim:

A feed dispenser comprising: a drum having an open bottom and a removable top closure, a base having a platform top, means for supporting the drum above the platform, and a distributing cone on the platform below the drum, a vibrator ring loosely mounted within the drum, substantially above the cone, and adapted to vibrate violently upon agitation of the drum to counteract arching or compacting of the dispensed article.

References Cited in the file of this patent

UNITED STATES PATENTS

| | | |
|---|---|---|
| 137,390 | Stamberger | Apr. 1, 1873 |
| 177,778 | Winterscheid et al. | May 23, 1876 |
| 369,155 | Babcock | Aug. 30, 1887 |
| 837,390 | Easton et al. | Dec. 4, 1906 |
| 1,200,892 | Shiffer | Oct. 10, 1916 |
| 1,367,971 | Hunnicutt | Feb. 8, 1921 |
| 1,392,004 | Fouts | Sept. 27, 1921 |
| 1,779,016 | Scholle | Oct. 21, 1930 |
| 2,153,455 | Casper et al. | Apr. 4, 1939 |
| 2,273,616 | Beatty | Feb. 17, 1942 |